United States Patent
Lopez et al.

(10) Patent No.: US 8,774,248 B2
(45) Date of Patent: Jul. 8, 2014

(54) RECEIVER FOR MUROS ADAPTED TO ESTIMATE SYMBOL CONSTELLATION USING TRAINING SEQUENCES FROM TWO SUB-CHANNELS

(75) Inventors: Miguel Lopez, Solna (SE); Tomas Andersson, Vasteras (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 666 days.

(21) Appl. No.: 12/864,772

(22) PCT Filed: Nov. 4, 2008

(86) PCT No.: PCT/SE2008/051255
§ 371 (c)(1),
(2), (4) Date: Jul. 27, 2010

(87) PCT Pub. No.: WO2009/096841
PCT Pub. Date: Aug. 6, 2009

(65) Prior Publication Data
US 2010/0323685 A1    Dec. 23, 2010

Related U.S. Application Data

(60) Provisional application No. 61/024,682, filed on Jan. 30, 2008, provisional application No. 61/028,045, filed on Feb. 12, 2008.

(30) Foreign Application Priority Data

Jan. 30, 2008    (WO) ................. PCT/SE2008/050116

(51) Int. Cl.
*H04B 1/00*    (2006.01)

(52) U.S. Cl.
USPC ........... 375/130; 375/347; 370/203; 370/215; 455/422.1

(58) Field of Classification Search
USPC .................. 370/312; 375/219, 260, 267, 299; 455/130, 422.1
See application file for complete search history.

(56) References Cited

U.S. PATENT DOCUMENTS

| | | | |
|---|---|---|---|
| 4,736,170 | A | 4/1988 | Wu et al. |
| 5,469,112 | A | 11/1995 | Lee |

(Continued)

FOREIGN PATENT DOCUMENTS

| | | |
|---|---|---|
| CN | 1473402 A | 2/2004 |
| CN | 1533071 A | 9/2004 |

(Continued)

OTHER PUBLICATIONS

3rd Generation Partnership Project. "Voice Capacity Evolution with Orthogonal Sub Channels." 3GPP TSG GERAN #36, Tdoc GP-071792, Agenda Item 6.1, 7.1.5.18, Vancouver, Canada, Nov. 12-16, 2007.

(Continued)

*Primary Examiner* — Leon-Viet Nguyen
(74) *Attorney, Agent, or Firm* — Coats and Bennett, P.L.L.C.

(57) ABSTRACT

A receiver is provided that is configured to estimate the symbol constellation of a signal modulated using a quaternary symbol constellation where data is transmitted to two mobile stations multiplexed on a shared channel comprising two branches, where the branches correspond to the real and imaginary parts of one complex-valued baseband signal. The receiver is configured to demodulate the modulated signal using the training sequences from both sub-channels.

14 Claims, 4 Drawing Sheets

(56) References Cited

U.S. PATENT DOCUMENTS

| | | |
|---|---|---|
| 6,185,259 B1 | 2/2001 | Dent |
| 6,385,233 B1 | 5/2002 | Berger |
| 6,421,398 B1 | 7/2002 | McVey |
| 6,654,405 B1 * | 11/2003 | McDonough .................. 375/130 |
| 7,944,884 B2 | 5/2011 | Chitrapu et al. |
| 8,149,727 B2 | 4/2012 | Futagi et al. |
| 2002/0037059 A1 * | 3/2002 | Heegard et al. ................ 375/341 |
| 2002/0110154 A1 | 8/2002 | Odenwalder |
| 2003/0099306 A1 * | 5/2003 | Nilsson et al. ................. 375/316 |
| 2004/0013172 A1 | 1/2004 | Hashiguchi et al. |
| 2004/0114551 A1 * | 6/2004 | Gavillero et al. .............. 370/324 |
| 2005/0084044 A1 * | 4/2005 | Kokkonen ...................... 375/347 |
| 2005/0152473 A1 | 7/2005 | Maltsev et al. |
| 2005/0254600 A1 | 11/2005 | Chen et al. |
| 2007/0070968 A1 | 3/2007 | Kawasaki |
| 2007/0195907 A1 | 8/2007 | Wang et al. |
| 2007/0268977 A1 | 11/2007 | Wang et al. |
| 2008/0159246 A1 | 7/2008 | Niemela |
| 2008/0240151 A1 | 10/2008 | Chitrapu et al. |
| 2010/0157833 A1 * | 6/2010 | Vrcelj et al. ................... 370/252 |
| 2010/0208716 A1 | 8/2010 | Mujtaba et al. |

FOREIGN PATENT DOCUMENTS

| | | |
|---|---|---|
| CN | 101005303 A | 7/2007 |
| EP | 1037437 A2 | 9/2000 |
| EP | 2238724 A1 | 10/2010 |
| JP | H11122312 A | 4/1999 |
| WO | 2007037412 A1 | 4/2007 |
| WO | 2009096832 A1 | 8/2009 |

OTHER PUBLICATIONS

3rd Generation Partnership Project. "Multi-User Reusing-One-Slot (MUROS)." 3GPP TSG GERAN #36. GP-072027, Agenda Item 6.1, 7.1.5.18, Vancouver, Canada, Nov. 12-16, 2007.

CN Search Report issued Aug. 20, 2012 in re CN Application No. 2008801258920 filed on Nov. 14, 2008.

Nokia, "Voice Capacity Evolution with Orthogonal Sub Channel", 3GPP TSG GERAN #33, Tdoc GP-070214, Agenda Item 6.1,7.1.5.6, pp. 1-8, Feb. 12-16, 2007, Seoul, South Korea.

Khairy, M.M., "Asymmetric Modulation and Multistage Coding for Multicasting with Multi-Level Reception over Fading Channels", Conference publication, IEEE Military Communications Conference Proceedings, Atlantic City, NJ, Oct. 31, 1999, pp. 92-96, vol. 1, IEEE, US.

Hill, D. et al, "Carrier Detection of Unbalanced QPSK Direct Sequence Signals", Military Communications Conference Proceedings, 1999, pp. 437-441, IEEE, vol. 1.

* cited by examiner

PRIOR ART

RECEIVER FOR MUROS ADAPTED TO ESTIMATE SYMBOL CONSTELLATION USING TRAINING SEQUENCES FROM TWO SUB-CHANNELS

TECHNICAL FIELD

The present invention relates to a method and a device for receiving signals transmitted in a cellular radio system.

BACKGROUND

The rapid growth of the subscriber base in GSM (Global System for Mobile communications) has stressed the need for increased voice capacity. Thus, both mobile network operators and telecom equipment manufacturers have agreed to open a new study item in the 3GPP standardization. The study item has been named MUROS and is described in GP-072027, "WID on MUROS". The basic idea is to allow two users to share the same frequency band and the same time slot, both in the downlink and in the uplink. There are several possible technical realizations of MUROS. One proposed technique is to use a hybrid quadrature modulation in the downlink channel. The two user signals are mapped to the real and imaginary parts of the baseband signal. These are called the I- and Q-sub-channels, and under some conditions they are orthogonal, and therefore named OSC (Orthogonal Sub-Channels). The technique can be made to include modulation of data transmitted using a QPSK modulation scheme in a cellular radio system to two mobile stations multiplexed on a shared channel comprising two branches, such that the total energy of the QPSK modulated is divided unequally between the two branches of the modulated signal resulting in that an improved radio system can be obtained. The modulation with energy divided unequally between the two branches of the modulated signal can be termed hybrid quadrature modulation. Such a modulation method is further described in the co-pending international patent application No. PCT/SE2008/050116 incorporated herein by reference.

In the hybrid quadrature modulation, the symbol constellation is in quadrature, with the 4 symbols lying on the unit circle in the complex plane. The orthogonality of the I and Q branches is preserved. However, a cross power branch ratio parameter $\alpha$ is introduced, allowing the total energy of the signal to be divided unequally between the two sub channels. This parameter $\alpha$ may be changed over time. The parameter may for example be changed from one transmission time slot to the next transmission time slot. It is chosen so that $0 \leq \alpha \leq 1$ or $(0 \leq \alpha \leq \sqrt{2})$ In the extreme case when $\alpha=1$ the power is divided equally between the I/Q branches, resulting in ordinary QPSK modulation. When $\alpha=0$ all the signal power is given to one of the branches yielding BPSK modulation. Other values of $\alpha$ causes intermediate distributions of the total energy between the I and Q sub channels. In accordance with one embodiment, the parameter $\alpha$ can be chosen adaptively, for example based upon feedback from one or both mobile stations receiving data via the shared downlink channel, or using a fixed scheme. Thus, the user data is modulated using a quaternary symbol constellation where the data is transmitted to two mobile stations multiplexed on a shared channel comprising two branches, where the branches correspond to the real and imaginary parts of one complex-valued baseband signal.

This allows compatibility between MUROS capable networks and legacy mobile stations.

Even though legacy mobiles are supported by the hybrid quadrature modulation described above, new mobiles will still be required because a new training sequence set is introduced.

The hybrid quadrature modulation can employ a time varying symbol constellation called adaptive $\alpha$-QPSK. This quaternary constellation is parameterized by a real-valued parameter $\alpha$. This parameter defines the shape of the symbol constellation, and it can change from burst to burst. Thus, in theory, there can be an infinite number of different symbol constellations. However, in some embodiments the total number of possible symbol constellations is finite. Adaptive $\alpha$-QPSK has in one embodiment been designed so that the mobile station receiver need not know the shape of the constellation in order to successfully demodulate and decode the received signal. The two sub-channels can be separated by means of orthogonal training sequences. A traditional receiver might employ SAIC (Single Antenna Interference Cancellation), and it will only need to know its own training sequence in order to demodulate and decode its sub-channel. Such a receiver is depicted in FIG. 2.

A problem with a conventional receiver is that the energy contained in the other orthogonal sub-channel (i.e. the sub-channel intended for the other user) constitutes a source of interference and it is not an aid but rather a hinder to the successful demodulation of the desired signal.

In 3GPP GP-070214, "Voice Capacity Evolution with Orthogonal Sub Channel", source Nokia, it is proposed that new mobiles might have knowledge of the training sequence of the other sub-channel and use it in order to improve the equalization of the desired signal. However, this approach cannot be used if hybrid quadrature modulation is employed since the shape of the symbol constellation may not be known. In other words, knowledge of the two training sequences does not entail knowledge of the quadrature training symbols.

Hence, there exist a need for a method and a system that is able to efficiently demodulate a signal modulated using a hybrid quadrature modulation. In particular there exist a need for a demodulator that efficiently can demodulate an $\alpha$-QPSK modulated signal.

SUMMARY

It is an object of the present invention to overcome or at least reduce some of the problems associated with existing receivers for receiving QPSK modulated signals It is another object of the present invention to provide a method and a device that is capable of efficiently demodulate a signal modulated using a hybrid quadrature modulation.

At least one of the above objects is obtained by a method and a receiver as set out in the appended claims. Hence, a receiver is provided that is configured to estimate the symbol constellation of a quaternary symbol constellation where data is transmitted to two mobile stations multiplexed on a shared channel comprising two branches, where the branches correspond to the real and imaginary parts of one complex-valued baseband signal. The receiver is configured to demodulate the modulated signal using the training sequences from both sub-channels.

In accordance with one embodiment the receiver is adapted to receive an $\alpha$-QPSK modulated signal.

In accordance with one embodiment, the estimation of the symbol constellation such as the $\alpha$ of an $\alpha$-QPSK modulated signal is improved by using memory from previous transmission bursts. This is possible because the constellation has been observed to remain constant during at least shorter time periods (e.g. the duration of one Slow Associated Control Channel (SACCH) measurement period), or to change in accordance with predetermined pattern. Thus, by storing the constellation from at least one previous burst in a memory, and using the stored previous constellation will provide a better estimate of the shape of the present constellation.

In accordance with one embodiment demodulation of -QPSK modulated signal is performed using an estimated value of $\alpha$.

The invention also extends to a method of receiving a quaternary symbol constellation where data is transmitted to two mobile stations multiplexed on a shared channel comprising two branches, where the branches correspond to the real and imaginary parts of one complex-valued baseband signal in accordance with the above.

BRIEF DESCRIPTION OF THE DRAWINGS

The present invention will now be described in more detail by way of non-limiting examples and with reference to the accompanying drawings, in which.

DETAILED DESCRIPTION

Figure 1:
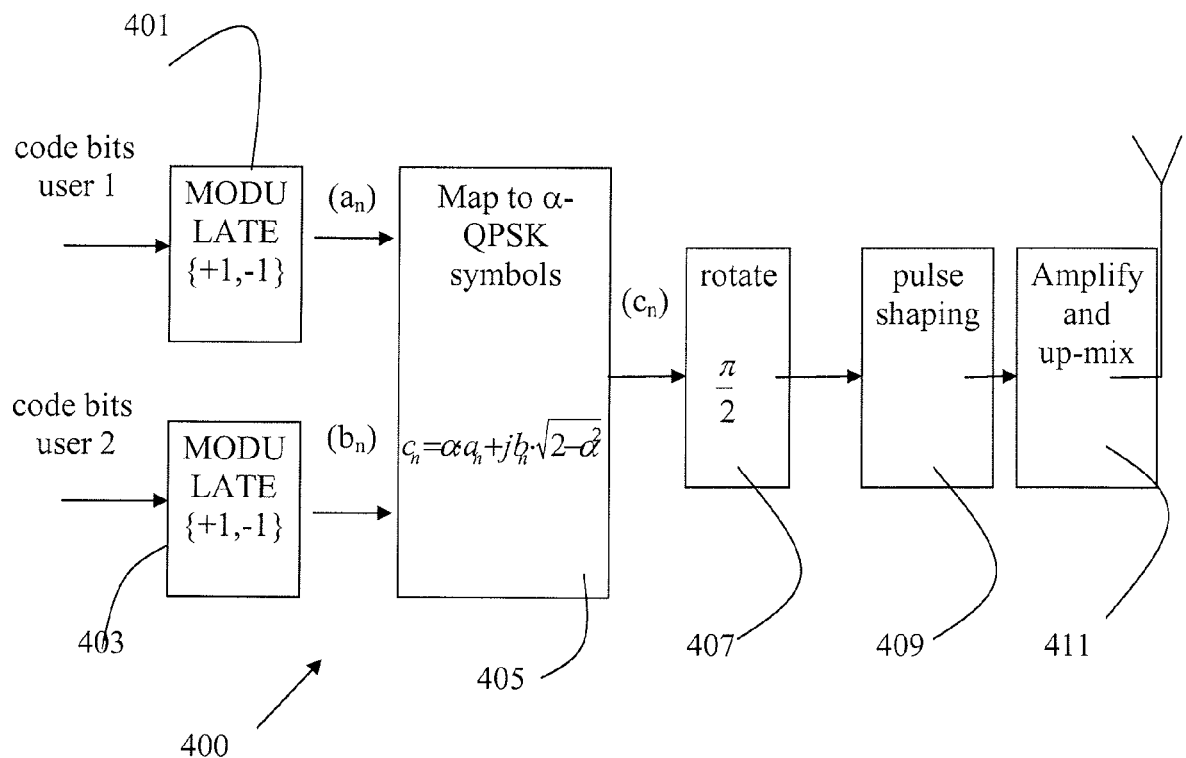
FIG. 1 is a view of an adapted $\alpha$-QPSK modulator.
Figure 2:
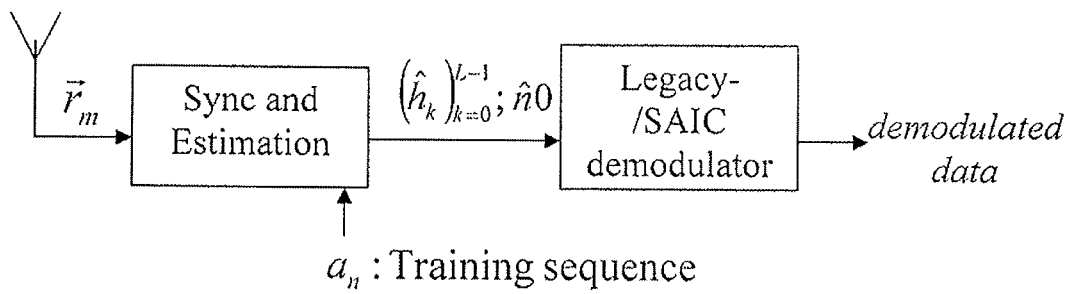
FIG. 2 is a view of a conventional receiver.

In the following, the circumflex ˆ on top a variable denotes an estimator of said variable. In FIG. 1, a modulator 400 configured to divide the total energy of a QPSK modulated signal unequally between the two branches of the modulated signal is depicted. The exemplary modulator 400 can be used in transmission of data using an adaptive $\alpha$-QPSK modulation. The modulator 400 comprises initial modulators 401 and 403 for receiving and modulating to binary symbols the data sequences to be transmitted to two different mobile stations. The modulators 401 and 403 are coupled to a mapping unit 405 adapted to map the signals from the modulators 401 and 403 in accordance with an adaptive $\alpha$-QPSK constellation such as the one described hereinabove. The adaptive $\alpha$-QPSK constellation sequence formed in the unit 405 is forwarded to a rotation block 407 connected to a pulse shaping filter 409 which in turn is connected to a unit 411 adapted to amplify and mix-up the multiplexed data sequence to be transmitted to the intended receivers to the carrier frequency.

The modulator 400 may receive feedback from one or both mobile stations to which data is transmitted. In response to received feedback the modulator can be adapted to adjust $\alpha$ accordingly. For example $\alpha$ may be set to depend upon the distances from the two mobile stations to the Base Transceiver Station (BTS), the reported received signal quality (RXQUAL), or upon the capabilities of the mobile stations (e.g. legacy/$\alpha$-QPSK aware).

In a receiver the $\alpha$ can be estimated to improved reception of the modulated signal. Without loss of generality, assume that the receiver must decode the signal intended for user 1. The baseband received signal ($r_n$) sampled at the symbol rate can be written in terms of an L-tap complex-valued channel $(h_k)_{k=0}^{L-1}$, the desired user binary training symbols $(a_n)_{n=0}^{N}$, the binary training symbols for user 2, $(b_n)_{n=0}^{N}$, the synchronization position n0 and noise ($w_n$):

$$r_{n+n0} = \frac{\alpha}{\sqrt{2}} \sum_{k=0}^{L-1} h_k j^{(n-k)} a_{n-k} + j \frac{\sqrt{2-\alpha^2}}{\sqrt{2}} \sum_{k=0}^{L-1} h_k j^{(n-k)} b_{n-k} + w_n$$

Equivalently, after de-rotation by 90 degrees, $$r'_{n+n0} = \frac{\alpha}{\sqrt{2}} \sum_{k=0}^{L-1} h'_k a_{n-k} + j \frac{\sqrt{2-\alpha^2}}{\sqrt{2}} \sum_{k=0}^{L-1} h'_k b_{n-k} + w_n$$

where the prime indicates that the signal and the channel taps have been de-rotated. Note that n0, $\alpha$ and $(h_k')_{k=0}^{L-1}$ are unknown, while the two training sequences are assumed to be known.

The shape parameter $\alpha$ which corresponds to the distribution of energy between the two branches can be estimated by using a least squares estimator as follows. Define the column vector of received samples $$\vec{r}_m = \begin{bmatrix} r'_{m+L} \\ r'_{m+L+1} \\ M \\ r'_{m+L+N} \end{bmatrix}$$

and the regression matrices $$A_\alpha = \frac{\alpha}{\sqrt{2}} \begin{bmatrix} a_L & a_{L-1} & \Lambda & a_0 \\ M & O & & M \\ a_N & a_{N-1} & \Lambda & a_{N-L} \end{bmatrix},$$

$$B_\alpha = \frac{\sqrt{2-\alpha^2}}{\sqrt{2}} \begin{bmatrix} b_L & b_{L-1} & \Lambda & b_0 \\ M & O & & M \\ b_N & b_{N-1} & \Lambda & b_{N-L} \end{bmatrix}$$

$$S_\alpha = A_\alpha + jB_\alpha.$$

Then the estimators $\hat{\alpha}$ and $\hat{n}0$ of the shape $\alpha$ and the synchronization position n0 may be computed according to $$[\hat{\alpha}, \hat{n}0] = \underset{\alpha,n}{\operatorname{argmin}} \{\vec{r}_m^H \cdot (I_{N-L+1} - S_\alpha \cdot (S_\alpha^H \cdot S_\alpha)^{-1} \cdot S_\alpha^H) \cdot \vec{r}_m\}, \quad (1)$$

where the superscript H indicates transposition followed by conjugation and $I_{N-L+1}$ denotes the identity matrix of dimension (N−L+1). From this, it is possible to calculate a least squares estimate of the channel according to the equation:

$$\begin{bmatrix} \hat{h}'_0 \\ M \\ \hat{h}'_L \end{bmatrix} = (S_{\hat{\alpha}}^H \cdot S_{\hat{\alpha}})^{-1} \cdot S_{\hat{\alpha}}^H \cdot \vec{r}_{\hat{n}0}. \quad (2)$$

As an example, compare a traditional receiver for user 1 against a receiver that employs the channel estimate of equation (2). A calculation shows that if $\alpha$=0.7 then the proposed receiver would get a power boost of approximately 5 dB over the training sequence.

Consequently both the synchronization and the channel estimation would be improved. This in turn results in an overall improvement of the receiver performance.

Although the calculations have been performed on a signal sampled at the symbol rate, it is possible to modify the calculations to other sampling rates. Other types of estimates are possible, for example based on correlators.

Next, the use of memory to improve the estimation of α is discussed in detail below. Assume that the shape parameter α is known to be constant during a period of M bursts. (For example an SACCH measurement period of 104 bursts.) Then it is possible to keep memory between bursts in order to improve the accuracy of the estimator. An estimator of very low complexity and minimal memory requirements can be obtained. For example in accordance with one embodiment the receiver can be configured so that for the first (k−1) bursts the estimates $\hat{\alpha}_n$, 1≤n<k≤M have been computed according to (1), or according to some other estimate based on data from one burst only. Then a new estimate $\bar{\alpha}_k$ can be calculated as follows $$\bar{\alpha}_k := \frac{1}{k}\sum_{n=1}^{k} \hat{\alpha}_n. \qquad (3)$$

This estimate has the advantage that $$\text{var}(\bar{\alpha}_k) = \frac{\text{var}(\hat{\alpha}_k)}{k}.$$

Assuming that the variance of $\hat{\alpha}_k$ is constant. This demonstrates that $\bar{\alpha}_k$ has better performance than $\hat{\alpha}_k$, as the variance of $\bar{\alpha}_k$ will decay as k increase. The estimator (3) is not the only possibility. For example in accordance with another embodiment the equation (1) can be re-written in such a way that the information of the M bursts is used, by stacking the M received vectors into one vector of length (M*(N−L+1)). Such an implementation may be more complex. In general, if $\vec{r}^k$ denotes the k-th received burst, then it is possible to construct a statistic value:

$$\check{\alpha}_k = f(\vec{r}_1, \ldots, \vec{r}_k)$$

which is a more efficient estimator of α than any other estimator $\hat{\alpha} = g(\vec{r}_k)$. Here f and g denote generic functions several variables. In practice f might be realized by means of a recursive procedure such as a Kalman filter. The estimator in accordance with equation (3) can preferably be used.

Figure 3:
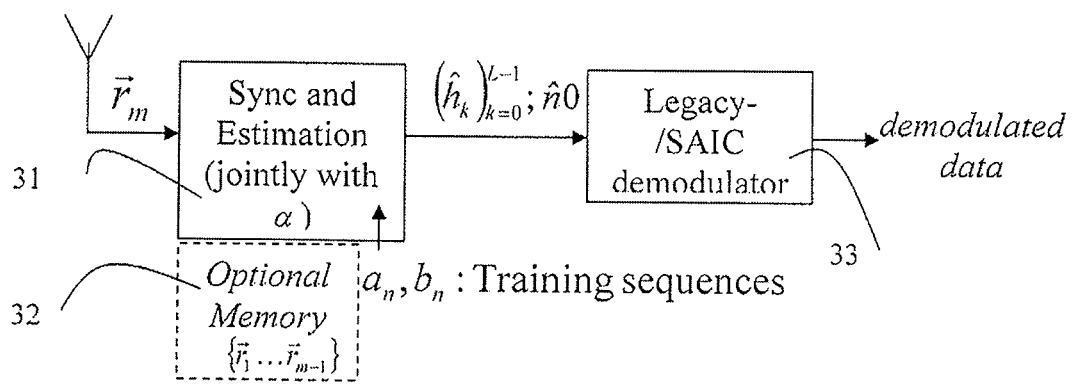
FIG. 3 is a view of a receiver using sequences from both sub-channels of an adapted $\alpha$-QPSK modulated signal.

In accordance with the above, since the parameter α may be unknown at the receiver, it is estimated using the training sequences from both sub-channels. In FIG. 3, a receiver operating in accordance with the above is depicted. Hence the receiver comprises a Synchronization and Estimation module 31 adapted to use training sequences from both sub-channels to provide an improved channel estimation and synchronization. Thus, in FIG. 3 the value of the parameter alpha, together with the training sequences from both sub-channels, are employed in order to improve channel estimation and synchronization in the module 31. The module 31 can optionally be associated with a memory 32 as described above. The output from the module 32 is forwarded to a demodulator 33 adapted to demodulate the signal based on the channel estimation and synchronization performed in the module 31. The reason is that by involving alpha and the two training sequences, more signal energy is used for synchronization and channel estimation. Even in an ideal noiseless system, ignoring alpha would imply that not all the energy from the received signal is available for synchronization and channel estimation. The demodulation is also improved as a consequence of improved synchronization and channel estimation. However, the value of alpha is not used directly in the demodulator.

Figure 4:
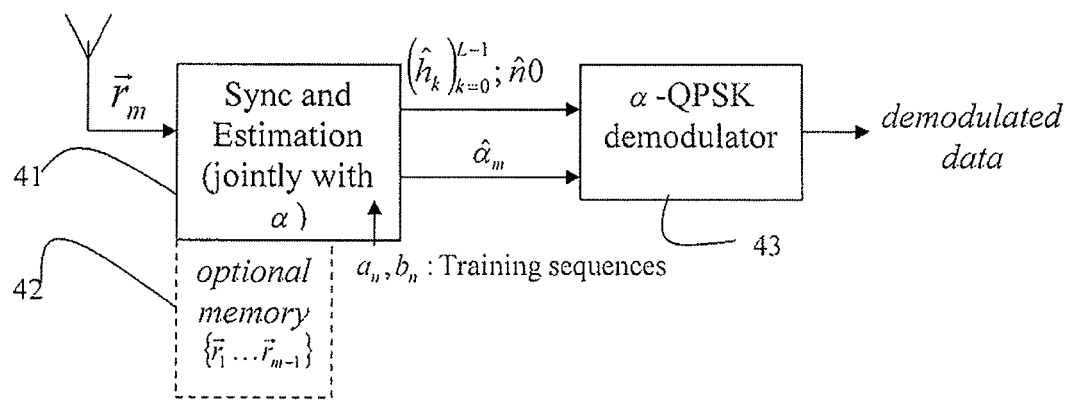
FIG. 4 is a view of a receiver using sequences from both sub-channels of an adapted $\alpha$-QPSK modulated signal.

By using the exact shape of the symbol constellation or equivalently the value of a parameter α corresponding to the power relation between the two branches of the modulated signal in an adaptive α-QPSK constellation, a more accurate synchronization, channel estimation and demodulation are possible, resulting in improved performance, thus turning the energy in the other sub-channel from a hinder to an advantage, as is shown in FIG. 4.

Thus, in FIG. 4 synchronization and channel estimation are performed in the same way shown in FIG. 3 in a corresponding module 41. The module 41 can also be associated with a memory 42 as described above. In addition, the constellation such as in the form of the value of alpha is fed to the demodulator 43. With the help of this parameter an accurate model of the received signal can be used in the demodulator. This model uses a quaternary symbol constellation, as opposed to the binary symbol constellation used in the legacy demodulator 33 shown in FIG. 3. Thus, while synchronization and channel estimation are performed in the same way in FIGS. 3 and 4, the demodulator in FIG. 4 uses a more accurate signal model than the demodulator shown in FIG. 3.

Figure 5:
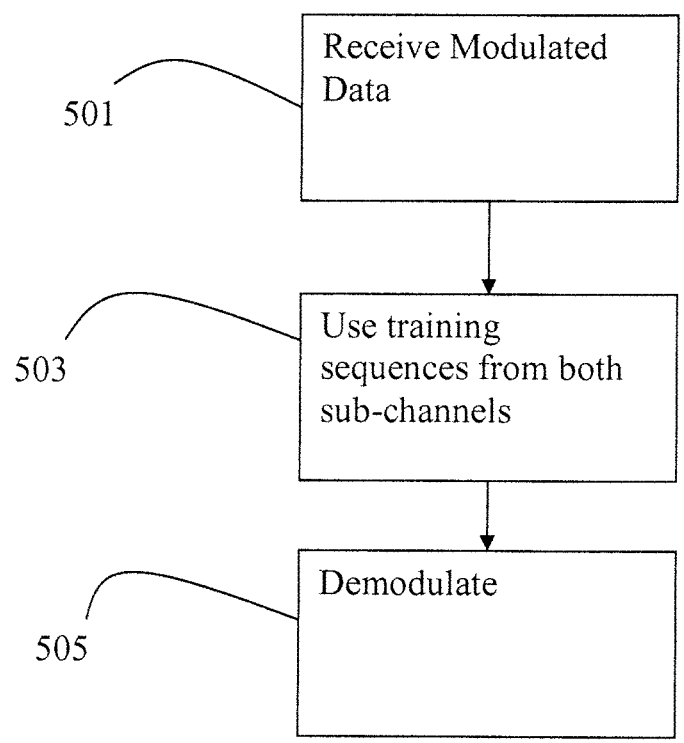
FIG. 5 is a flow chart illustrating steps performed when receiving a modulated data signal.

In FIG. 5 a flowchart depicting steps performed in a receiver when receiving a data signal modulated using a quaternary symbol constellation and where data is transmitted to two mobile stations multiplexed on a shared channel comprising two branches, where the branches correspond to the real and imaginary parts of one complex-valued baseband signal is shown.

First, in a step 501, the signal modulated data signal is received. Next, in a step 503, synchronization and channel estimation is performed using training sequences from both sub-channels. Thereupon, in a step 505, demodulation is performed. In accordance with one embodiment demodulation is performed using an estimation of the symbol constellation. For example an estimated value α can be used for an α-QPSK modulated signal.

As set out above, the parameter α might be unknown at the MS receiver. In accordance with one embodiment, the BSC or BTS signals the value of α to the Mobile Station (MS). By using the value of the parameter α, more accurate synchronization, channel estimation and demodulation are possible, resulting in improved MS performance.

In accordance with one embodiment, the value of α is chosen by a control unit in the BTS. The choice of α can for example be made based on quality measurements reported by the mobile stations or the capability of the mobile stations. The value of α can preferably be kept constant during the duration of one power control loop. Before updating the value of α, the BTS can be configured to send a control message to the mobile stations indicating the value of α that will be used during the duration of the next power regulation lap. For transmitting the information regarding what α to use Layer 2 (L2), Layer 3 (L3) or in-band signaling may be used. For example the Slow Associated Control Channel (SACCH) can carry the message.

In accordance with one embodiment the control unit deciding a can be located in the BSC. The value of α is then transmitted to the mobile stations in a corresponding manner as if α is chosen by a control unit in a BTS. By using the value of α the MS receiver can achieve better performance through improved channel estimation and/or quaternary demodulation. For example, the value α together with the two training sequences (there is one training sequence per sub-channel) can be used to give a power boost to the channel estimate. The reason is that all the energy of the received signal over the training sequence can be used in the channel estimate. In the traditional method only the energy of one sub-channel is used in the channel estimate.

Using the method and receiver as described herein above for estimating the shape of the symbol constellation enables the whole signal energy over the training sequences of the two sub-channels to be used for channel estimation and synchronization, resulting in improved performance over traditional Single Antenna Interference Cancellation SAIC receivers. For example, if α=0.7 then a receiver for the I-channel would receive a power boost of approximately 5 dB over the training sequence, resulting in an improved synchronization and channel estimation.

Also, by using the shape of the quadrature symbol constellation, an accurate model of the interference caused by the other sub-channel can be obtained, for example by using a quadrature trellis in the demodulator. This also results in improved performance over traditional receivers.

The invention claimed is:

1. A method of receiving modulated data in a mobile station, where the received data is modulated using a quaternary symbol constellation and where data is transmitted to two mobile stations multiplexed on a shared channel comprising two sub-channels, where the sub-channels correspond to the real and imaginary parts of one complex-valued baseband signal, said method comprising:
   estimating the symbol constellation of the quaternary symbol constellation modulated signal using training sequences from both sub-channels; and
   demodulating the modulated data using the estimated symbol constellation.

2. The method according to claim 1, wherein data are received via an α-QPSK modulated signal.

3. The method according to claim 1, further comprising the step of storing the symbol constellation from previous transmission bursts in a memory.

4. The method according to claim 3, further comprising the step of using the stored symbol constellation from previous bursts when estimating the symbol constellation.

5. The method according to claim 1, further comprising the step of using the estimated symbol constellation when performing synchronization.

6. The method according to claim 5, further comprising the step of jointly estimating the symbol constellation and performing synchronization.

7. The method according to claim 1, further comprising the step of using the estimated symbol constellation when estimating the channel.

8. The method according to claim 7, further comprising the step of jointly estimating the symbol constellation and the channel.

9. A receiver for receiving modulated data in a mobile station, the receiver being adapted to receive a signal modulated using a quaternary symbol constellation transmitted to two mobile stations multiplexed on a shared channel comprising two sub-channels, where the sub-channels correspond to the real and imaginary parts of one complex-valued baseband signal, the receiver comprising:
   an estimation module adapted to estimate the symbol constellation of the quaternary symbol constellation modulated signal using training sequences from both sub-channels; and,
   a de-modulator adapted to use the estimated symbol constellation when demodulating the modulated data.

10. The receiver according to claim 9, wherein the receiver is adapted to receive an α-QPSK modulated signal.

11. The receiver according to claim 9, further comprising a memory for storing constellation from previous transmission bursts.

12. The receiver according to claim 11, wherein the estimation module is connected to the memory and the estimation module is adapted to use the constellation from previous transmission bursts when estimating the symbol constellation.

13. The receiver according to claim 9, wherein the estimation module is adapted to perform synchronization.

14. The receiver according to claim 9, wherein the estimation module is adapted to estimate the channel using the estimated symbol constellation.

* * * * *

UNITED STATES PATENT AND TRADEMARK OFFICE
CERTIFICATE OF CORRECTION

PATENT NO. : 8,774,248 B2
APPLICATION NO. : 12/864772
DATED : July 8, 2014
INVENTOR(S) : Lopez et al.

It is certified that error appears in the above-identified patent and that said Letters Patent is hereby corrected as shown below:

In the Specification

In Column 1, Line 51, delete "$(0 \leq \alpha \leq \sqrt{2})$" and insert -- $(0 \leq \alpha \leq \sqrt{2})$. --, therefor.

In Column 3, Line 8, delete "-QPSK" and insert -- α-QPSK --, therefor.

In Column 4, Lines 57-61, in Equation (2), delete $$\begin{bmatrix} \hat{h}'_0 \\ M \\ \hat{h}'_L \end{bmatrix} = (S^H_{\hat{\alpha}} \cdot S_{\hat{\alpha}})^{-1} \cdot S^H_{\hat{\alpha}} \cdot \vec{r}_{\hat{n}0}$$

and insert --

$$\begin{bmatrix} \hat{h}'_0 \\ \vdots \\ \hat{h}'_L \end{bmatrix} = (S^H_{\hat{\alpha}} \cdot S_{\hat{\alpha}})^{-1} \cdot S^H_{\hat{\alpha}} \cdot \vec{r}_{\hat{n}0}$$

--, therefor.

In Column 5, Line 64, delete "module 32" and insert -- module 31 --, therefor.

Signed and Sealed this
Seventeenth Day of February, 2015

Michelle K. Lee
*Deputy Director of the United States Patent and Trademark Office*